Patented May 7, 1935

2,000,453

UNITED STATES PATENT OFFICE 2,000,453

ENAMEL AND PROCESS OF MAKING SAME

John J. Murray, Arlington, and Louis A. White, Medford, Mass.; said White assignor to Rogers Isinglass & Glue Company, Gloucester, Mass.

No Drawing. Application February 21, 1933, Serial No. 657,840

11 Claims. (Cl. 95—7)

This invention relates to composition enamels and particularly to enamels adapted for use in the preparation of plates used in photoengraving, the object of the invention being to provide a liquid composition which will last for a long time without deteriorating and which when placed upon a plate will be soluble in water until portions thereof have been hardened by being subjected to heat or light.

When portions of the enamel have been hardened the remaining portions may be washed away leaving the hardened portions raised on the plate and in condition for an electroplate to be formed thereon.

This enamel is especially adapted for use in making half tones for printing.

The invention further consists in the process of making the composition enamel.

One preferred form of composition is described herein, this form having been found to give satisfactory and reliable results, although it is to be understood that the various ingredients of said composition may be varied in number, character, and quantities, and the invention is not limited to the precise combination of ingredients as herein described, except as required by the scope of the appended claims.

The composition enamel is in the form of a liquid and contains glue, concentrated ammonium hydroxide, chromic acid and alcohol.

When these ingredients are properly mixed chemical action will take place in the mixture which will cause the liquid to last for a long time without any deterioration.

Heretofore, in the photo-engraving process, when other substances are used in the preparation of the plates, the composition deteriorates very rapidly and consequently there is considerable loss incurred unless freshly manufactured compositions are always at hand.

It is a disadvantage to be obliged to be constantly preparing new compositions during the manufacture of photo-engraved plates.

This objection is wholly overcome by the composition herein described as the liquid composition when placed in containers will be in proper condition for use an almost indefinite period.

It is obvious that a composition of this character has many advantages as it is always ready for use, is economical as it does not deteriorate, and is easily applied to material during the manufacture of photo-engraving plates to be used in printing.

In the manufacture of the composition a predetermined quantity of glue is taken and thinned by means of water to form a liquid glue and this thinned glue is mixed thoroughly with concentrated ammonium hydroxide.

In the manufacture of a gallon of the composition enamel fish glue is preferred and about twenty ounces of such glue is mixed with about ten ounces of water and two ounces of concentrated ammonium hydroxide.

After this glue, water and concentrated ammonium hydroxide has been thoroughly mixed, it is allowed to stand about fifteen minutes, after which two ounces of 99 per cent. proof chromic acid is added thereto and the entire mixture is thoroughly stirred.

A predetermined quantity of alcohol and a predetermined quantity of water is mixed in a separate container, the quantities preferably used being about sixty-four ounces of alcohol and eight ounces of the water.

This latter mixture of alcohol and water is then mixed with the first mentioned mixture of thinned glue, ammonium hydroxide and chromic acid, and a chemical action will take place in this combined mixture to raise the temperature thereof about twenty-five degrees higher than when the two mixtures were first combined.

After the temperature of the combined mixture has been thus raised it is then subjected to an intense light from a 1000 watt lamp for about four hours.

After being subjected to this intense light, the combined mixture is put in an autoclave retort and sealed tight, and when thus sealed it is subjected to a heat of approximately 260 degrees, and also to a pressure of about twenty pounds.

The combined mixture is thus subjected to this intense heat and pressure for about one hour, after which the mixture is strained, cooled and placed in containers ready for use.

The composition thus manufactured is particularly adapted for photomechanical engraving purposes on different kinds of material, as for instance, metal, celluloid, glass, etc., forming a hardened film on the material when subjected to light for reproducing an image on the hardened film.

This light may be any light such as a strong 1000 watt incandescent lamp, and it is not necessary to depend on a carbon arc light as is sometimes used in the industry of photo-engraving on other forms of composition.

When the hardened film is placed on any material and subjected to heat of substantially 260° F. it will form a hard enamel.

Until exposed to light or heat as previously mentioned this enamel will be soluble in water and when in forming a half tone a screen is placed over the enamel, the parts exposed to light or heat through the mesh of the screen will become hardened and when the screen has been removed the parts previously covered by the mesh may be washed away, leaving raised surfaces on the material from which an electroplate may be formed to be subsequently used in printing.

The enamel plate may be used by itself for printing etchings or for other purposes by photographing an image on the enameled surface and then when the unexposed surfaces have been washed away, applying a suitable acid to eat into the metal plate, thereby leaving other raised hardened portions of enamel on the plate adapted to reproduce the original photograph.

On the other hand, in some cases after the etching on the plate has been completed, all of the enamel may be removed and the print be produced directly from the etched plate.

It is believed that the operation and many advantages of the invention will be understood without further description.

Having thus described our invention, we claim

1. A composition enamel including to each gallon, about twenty ounces of glue, about two ounces of ammonium hydroxide, about sixty-four ounces of alcohol and about one and a half ounces of chromic acid.

2. A composition enamel including to each gallon, about twenty ounces of fish glue, about two ounces of ammonium hydroxide, about sixty-four ounces of alcohol and about one and a half ounces of chromic acid.

3. A composition enamel including to each gallon, about twenty ounces of thin glue, about two ounces of ammonium hydroxide, two ounces of chromic acid, sixty-four ounces of alcohol and eighteen ounces of water.

4. The process of making five gallons of a composition enamel consisting of mixing about nine pounds of liquid glue, about one pint of concentrated ammonium hydroxide, about three gallons of alcohol and one and a half ounces of chromic acid, subjecting the mixture to a heat of about 260° F., and then cooling the same.

5. The process of making five gallons of a composition enamel consisting of mixing about nine pounds of liquid glue, about one pint of concentrated ammonium hydroxide, about three gallons of alcohol and about one and a half ounces of chromic acid, about one and a half gallons of water, and then subjecting the entire mixture to about a twenty pound pressure.

6. The process of making five gallons of a composition enamel consisting of mixing about nine pounds of liquid glue, about one pint of concentrated ammonium hydroxide, and about three gallons of alcohol, one and a half ounces of chromic acid, subjecting the entire mixture to a heat of about 260° F. and about a twenty pound pressure, and then cooling the same.

7. The process of making a composition enamel consisting of mixing for each gallon about twenty ounces of thin liquid glue, about two ounces of concentrated ammonium hydroxide, and two ounces of chromic acid, independently mixing sixty-four ounces of alcohol and eighteen ounces of water and subsequently adding this mixture to the previous mixture, subjecting the combined mixture to heat of substantially 260° F. and substantially twenty pounds pressure and then cooling the same.

8. The process of making a composition enamel consisting of mixing for each gallon, about twenty ounces of thin liquid glue, and about two ounces of concentrated ammonium hydroxide, subsequently adding to this mixture two ounces of chromic acid, independently mixing sixty-four ounces of alcohol and eighteen ounces of water and adding same to the previous mixture, then subjecting the combined mixture to heat of substantially 260° F. and substantially twenty pounds pressure and then cooling the same.

9. The process of making a composition enamel consisting of taking twenty ounces of glue, thinning the same with water, then mixing therewith two ounces of concentrated ammonium hydroxide, subsequently adding to this mixture two ounces of 99% proof chromic acid and stirring the mixture, independently mixing sixty-four ounces of alcohol and eight ounces of water and then adding this mixture to the previous mixture to raise the temperature thereof, subjecting the combined mixture to light of a 1000 watt incandescent lamp, placing the combined mixture in an autoclave retort, sealing the same tight and then subjecting the mixture in said retort to heat at about a temperature of 260° F. and to a pressure of about twenty pounds, and then cooling the mixture.

10. The process of making a composition enamel consisting of taking twenty ounces of glue, thinning the same with about ten ounces of water, then mixing therewith two ounces of concentrated ammonium hydroxide, then allowing the mixture to stand for about fifteen minutes, adding to this mixture two ounces of 99% proof of chromic acid and stirring the mixture, increasing the temperature of the mixture by the addition of a mixture of sixty-four ounces of alcohol and eight ounces of water, subjecting the combined mixture to the light of a 1000 watt incandescent lamp for about four hours, placing the mixture in an autoclave retort, sealing the same tight and then subjecting the mixture in said retort to heat of about 260° F. and to a pressure of about twenty pounds, keeping the mixture subjected to this heat and pressure for about one hour, and then cooling the mixture and placing it in containers ready for use.

11. The process of making a composition enamel consisting of taking substantially twenty ounces of fish glue, thinning the same with about ten ounces of water, then mixing therewith about two ounces of concentrated ammonium hydroxide, then allowing the mixture to stand for about fifteen minutes, adding to this mixture about two ounces of 99% proof chromic acid and stirring the mixture, adding thereto about sixty-four ounces of alcohol and about eight ounces of water independently mixed and raising the temperature of the combined mixture by chemical action then subjecting the combined mixture at its raised temperature to the light of a 1000 watt incandescent lamp for about four hours, placing the mixture in an autoclave retort, sealing the same tight and then subjecting the mixture in said retort to a heat of about 260° F. and to a pressure of about twenty pounds for about one hour, and then cooling the mixture and placing it in containers ready for use.

JOHN J. MURRAY.
LOUIS A. WHITE.